United States Patent [19]

Kawai

[11] Patent Number: 4,520,480
[45] Date of Patent: May 28, 1985

[54] DIGITAL TRANSMISSION SYSTEM

[75] Inventor: Kiyoaki Kawai, Tokyo, Japan

[73] Assignee: NEC Corporation, Tokyo, Japan

[21] Appl. No.: 495,230

[22] Filed: May 16, 1983

[30] Foreign Application Priority Data

May 18, 1982 [JP] Japan .................................. 57/84486

[51] Int. Cl.³ ............................ H04J 3/06; H04J 3/12
[52] U.S. Cl. .................................... 370/100; 370/111; 370/109
[58] Field of Search .................... 370/100, 102, 112, 4, 370/111, 110.1, 109, 83

[56] References Cited

U.S. PATENT DOCUMENTS

| | | | |
|---|---|---|---|
| 3,995,119 | 10/1976 | Pachynski, Jr. ...................... | 370/111 |
| 3,995,120 | 10/1976 | Pachynski, Jr. ...................... | 370/111 |
| 4,151,373 | 4/1979 | Widmer et al. ...................... | 370/111 |
| 4,157,458 | 6/1979 | Roche ................................. | 370/112 |
| 4,330,856 | 5/1982 | Takasaki et al. ..................... | 370/102 |
| 4,345,323 | 8/1982 | Chang ................................ | 370/112 |
| 4,359,770 | 11/1982 | Suzuka ............................... | 370/100 |

OTHER PUBLICATIONS

"A 140 Mbit/s Optical Transmission System with 8 km Repeater Spacing and Line Section Length of 96 km," K. Mouthaan et al., Philips' Telecommunicatie Industrie.

"Binary Line Codes for Digital Transmission on Optical Fibers," Optical Communication Conference, Amsterdam, Sep. 17-19, 1979.

Primary Examiner—Douglas W. Olms
Assistant Examiner—Kenneth I. Rokoff
Attorney, Agent, or Firm—Sughrue, Mion, Zinn, Macpeak & Seas

[57] ABSTRACT

A digital transmission system employing nBmB codes in which provision is made for insertion of service and auxiliary data bits. The transmitter of the transmission system includes a series to parallel converter, register file, pulse insertion circuit, nBmB encoder and parallel to series converter. The bit rate of the parallel n bit code streams is converted to produce an additional time slot after each occurrence of a predetermined number of data bits. Service and auxiliary data bits are inserted in the additional time slots. The receiver portion of the transmission system includes a series to parallel converter, followed by an nBmB decoder, a pulse separator, a register file and a parallel to series converter. At the receiver, the mB code is converted back to an nB code from which the service and auxiliary data bits are extracted and subsequently removed.

9 Claims, 14 Drawing Figures

DIGITAL TRANSMISSION SYSTEM

BACKGROUND OF THE INVENTION

This invention relates to a time-division multiple pulse code modulation system, and more particularly it relates to a digital transmission system which interleaves auxiliary signals in a multiplexed data bit stream, and also converts them to bit sequence independent line codes. The present invention is applicable to optical digital transmission systems.

The wide band characteristic of optical fiber cables has made it possible to employ nBmB (m>n) DC balanced codes (for instance, 5B6B codes and 6B8B codes) in line codes. Reference for such a proposal is made to, for example, "A 140 Mbit/s Optical Transmission System with 8 km Repeater Spacing and Line Section Length of 96 km", by K. Mouthaan and J. R. Schlechte, Conference Proceedings of Optical Communication Conference, Amsterdam, Sept. 17-19, 1979. However, this proposal merely suggests conversion to 5B6B line codes, but failed to mention anything about the service signal transmission, such as order wire and alarm transmission, required in the terminal repeater system. Since nBmB codes are block codes consisting of m bit words, it is necessary to synchronize words on the receiver side, thereby insuring synchronism. In the conventional optical digital transmission system, it would be most uneconomical to provide a separate electric transmission line for auxiliary signals.

SUMMARY OF THE INVENTION

An object of the present invention is to offer a digital transmission system which is capable of multiple transmission of service signals, such as order wire and alarms, with the main signals.

Another object of the present invention is to offer a digital transmission system which insures block synchronization by frame synchronization.

Still another object of the present invention is to offer a stable and yet economical communication system.

According to the present invention, a digital transmission system adapted to a time division multiplex system comprises: means for converting a serial input data bit stream into parallel n bit streams; means for converting the bit rate of the parallel n bit streams to produce an additional time slot per every predetermined number of data bits; means for inserting a service bit for frame synchronization and auxiliary data in the additional time slot in accordance with a predetermined interval to produce parallel n service-bit-inserted bit streams; means for converting mutually corresponding parallel n bits of the parallel n service-bit-inserted bit streams into parallel m bits to produce m bit streams; and means for multiplexing the parallel m bit streams into a single output bit stream.

The present invention enables stable operation for insuring word (or block) synchronization by frame synchronization for nBmB codes. By selecting a frame structure, it is possible to arbitrarily select the transmission speed and the number of auxiliary signals. The invention is further advantageous in that service signals such as order wires and alarms may be transmitted economically without providing a separate transmission line.

This invention will be more readily appreciated by those skilled in the art by reading the following detailed description taken in conjunction with the accompanying drawing.

DETAILED DESCRIPTION OF THE EMBODIMENT

Figure 1:
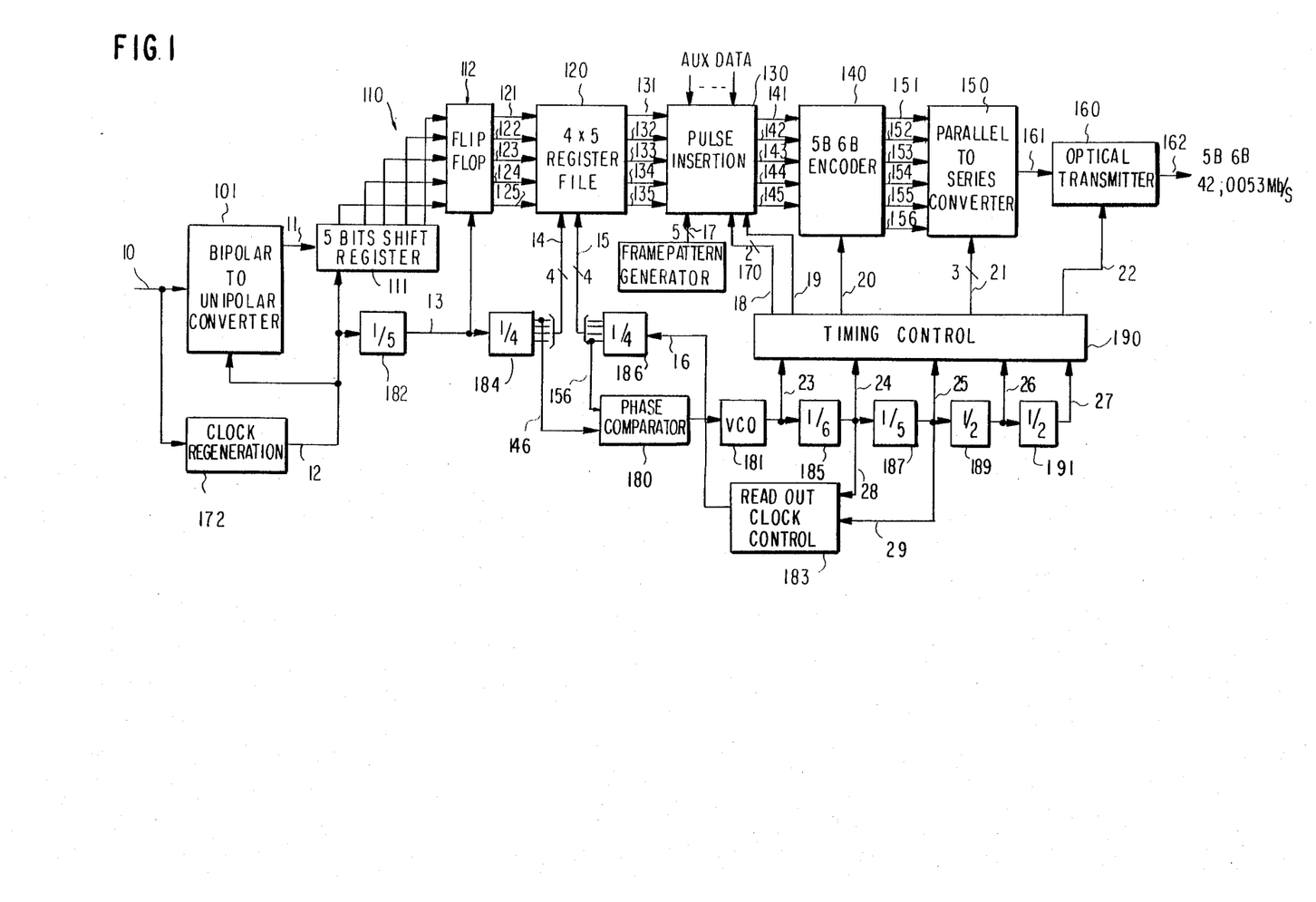
FIG. 1 is a block diagram for a transmitter of a terminal relay system embodying the present invention.

The terminal repeater according to one embodiment of the present invention shown in FIG. 1 includes a bipolar-to-unipolar converter 101, a serial-to-parallel (S-P) converter 110, a register file circuit 120, a pulse insertion circuit 130, a 5B6B encoder 140, a parallel-to-serial (P-S) converter 150, an optical transmitter 160 and a circuit for timing control 190. High density bipolar signals (HDB3; these signals are encoded to prevent occurrence of more than three consecutive 0s) on the line 10 from a multiplexer circuit, etc. are supplied to a clock regeneration circuit 172, where clocks are regenerated and converted to nonreturn-to-zero (NRZ) signals by the bipolar-to-unipolar converter 101. In this embodiment, HDB3 signals are 34.368 Mbit/s of the CEPT type of PCM hierarchy tertiary group. Accordingly, clock signals at this bit rate are recovered at the clock regeneration circuit 172 and applied to the bipolar-to-unipolar converter 101 which produces NRZ signals which are supplied via the line 11 to a 5-bit shift register 111. The shift register 111 and a 5 stage flip-flop 112 compose the S-P converter 110. Each parallel output of the 5-bit shift register 111 is supplied to a stage of the flip-flop 112 forming a latch. The register 111 outputs are converted to 5-bit parallel signals by latch pulses fed from a divider circuit 182 which divides basic clock pulses by five. The flip-flop 112 outputs are coupled to lines 121-125 respectively. The S-P converter is a demultiplexer which distributes bit by bit the serial data bits to 5 sequence streams. These parallel signals are coupled to a register file 120 for rate conversion.

Figure 2:
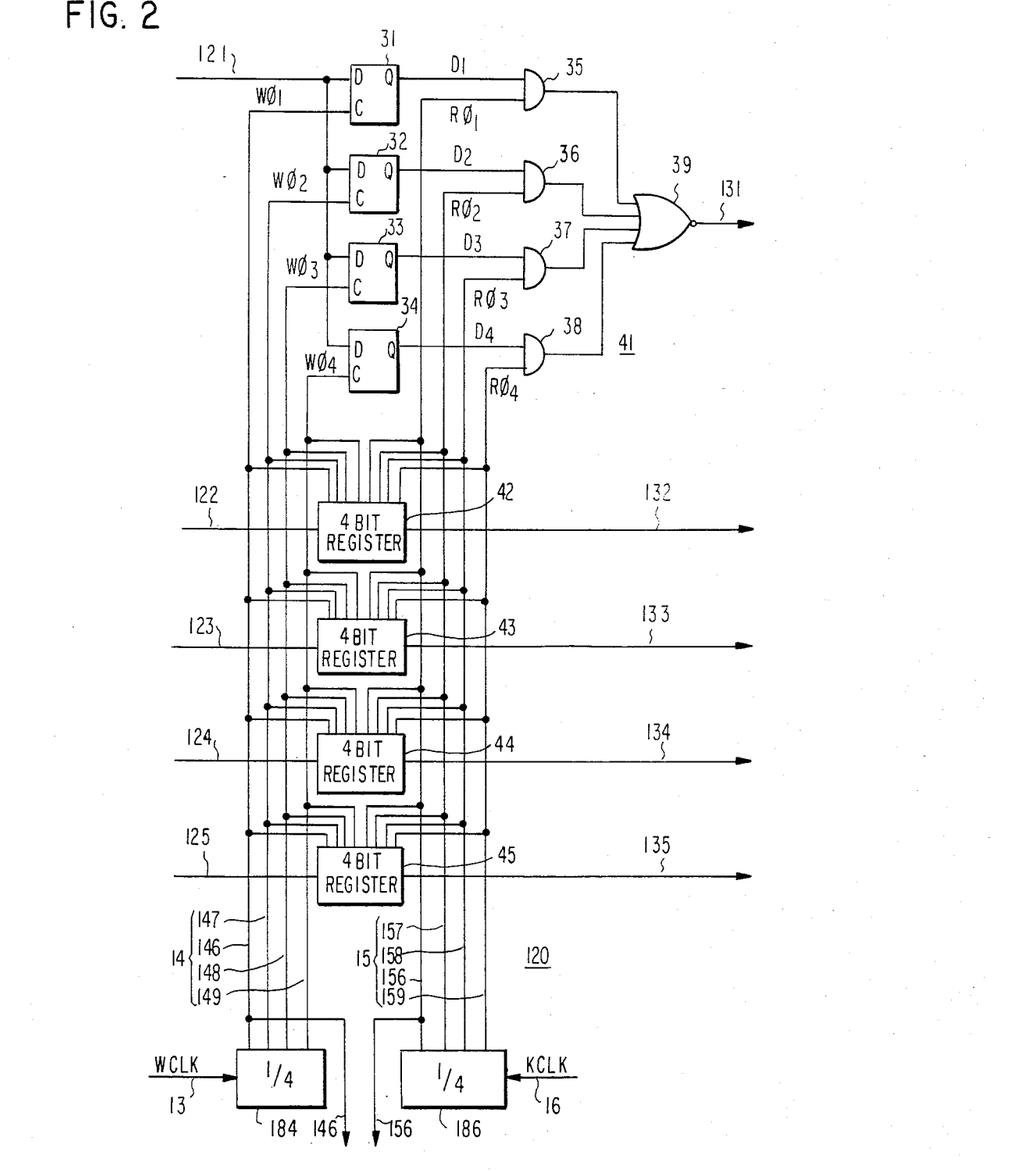
FIG. 2 is a block diagram for a register file used in an embodiment of the present invention.

Referring to FIG. 2, the register file 120 comprises five 4 bit registers 41-45. The register 41 includes four type-D flip-flops 31-34, and four AND gates 35-38 and a NOR gate 39. The data bits on the line 121 are sequentially provided to D-terminals of each flip-flop and written in by the clock pulses supplied to C terminals of respective flip-flops as output $W\emptyset_1$–$W\emptyset_4$ of the parallel terminals of a 4 stage ring counter 184. The ring counter 184 receives signals supplied by the 1/5 divider circuit 182 and runs. Data in the respective flip-flops are read out via the AND gates by outputs $R\emptyset_1$–$R\emptyset_4$ appearing at respective parallel terminals of a 4-stage ring counter 186, so as to be sequentially provided to the line 131 via the NOR gate 39. Clocks to the ring counter 186 are supplied to the line 16 as the outputs from a read out clock control circuit 183. Other registers 42–45, having the identical construction as that of the register 41, receive identical write clocks $W\phi_1$–$W\phi_4$ and read clocks $R\phi_1$–$R\phi_4$, and supply the outputs from the lines 122–125 to the lines 132–135 respectively after rate conversion.

Returning to FIG. 1, a voltage-controlled oscillator (VCO) 181 is an oscillator controlled to generate 42.0053 Mbit/s. This bit rate is equal to the bit rate supplied to an optical fiber 162 as an output of an optical transmitter 160. The output from VCO 181 is frequency divided by 6 at a divider 185, and the output from the divider 185 is further frequency divided by 55 at a divider 187, the output thereof is frequency divided by 2 at a divider 189, and that of the divider 189 by 2 at a divider 191. Therefore, the outputs of the dividers 185, 187, 189 and 191 are respectively 6, 330, 660 and 1220 frequency divisions of VCO clocks. The read out clock control circuit 183 is usually supplied on the line 28 with read clock pulses from the VCO divided by 6, and outputs the same to the line 16, but it inhibits the read clock to be supplied to the ring counter 186 in response to the output from a frequency divider 187 on a line 29. The inhibiting of a pulse occurs at every 55th read clock pulse.

Figure 5:
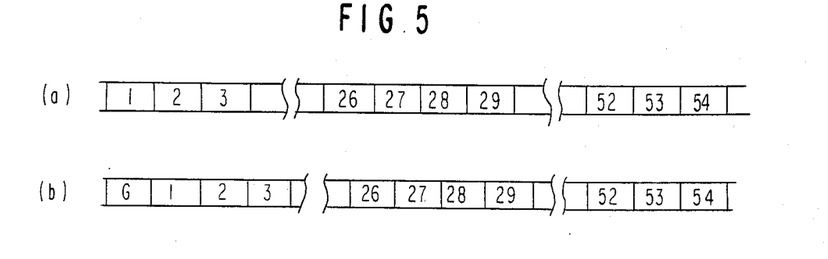
FIGS. 5a and 5b show 1-channel data formats before and after bit rate conversion.

Referring to FIG. 2 in conjunction with FIG. 1, an output from the line 146 of a ring counter 184 and a output from the line 156 of a ring counter 186 are respectively supplied to a phase comparator 180 for comparison, and controls VCO 181 by their outputs in order to keep the base difference within predetermined values. Therefore, registers of the register file are written in at the rate 6.8736 Mbit/s and read-out at the rate of 7.00089 Mbit/s, and the bit rate ratio is converted to 55/54, adding one additional time slot per 55 pulses. The read out clock control inhibits one pulse per every 55 pulses and supplies it to the ring counter 186, thus equalizing the number of pulses supplied per unit time. However, since the read out bit rate is faster than that of the write in, the data immediately before is consecutively read out in the time slot following every 54th data bit. Thus, the data format before rate conversion as shown in FIG. 5(a) becomes 55 bits as shown in FIG. 5(b) as a result of new time slot G (hereinafter referred to as the service bits) added thereto.

As discussed above, the data bit streams undergoing rate conversion are supplied to the pulse insertion circuit 130 respectively via the lines 131–135. Here, the auxiliary data bits are inserted in the newly created time slot; such bits being frame bits, order wire which transmits voice signals for maintenance between terminal stations, monitoring, and switcher control for switch-controlling the spare lines.

Figure 3:
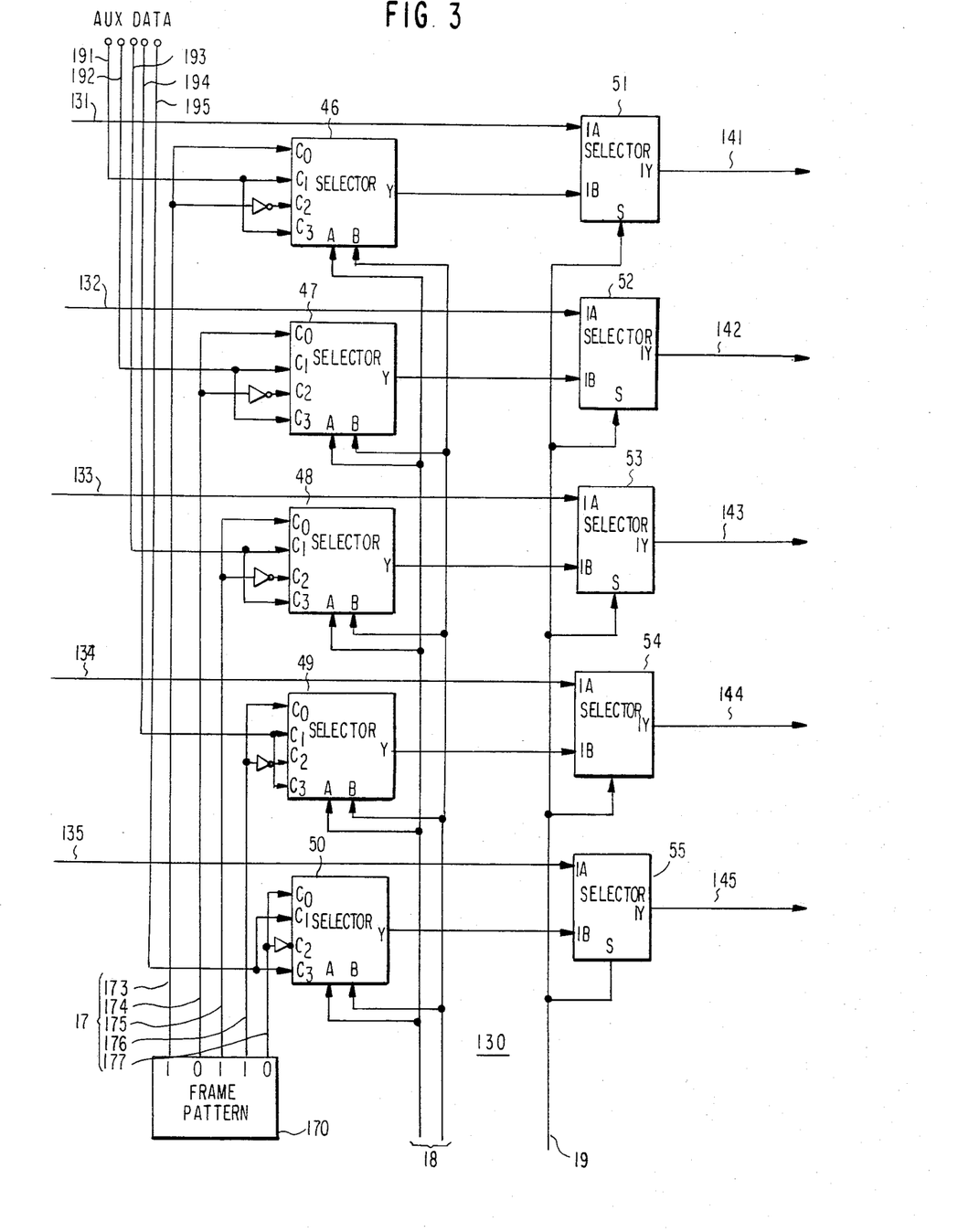
FIG. 3 is a block diagram for a pulse inserter used in the embodiment of the present invention.

Referring now to FIG. 3, a pulse insertion circuit 130 includes two selectors per 1 data bit stream. We shall now explain the stream which is input to the line 131 and is output on the line 141. An inserter for the stream comprises a selector 46 which selects one data bit out of four, and a selector 51 which selects one data bit out of two. The input terminals $C_0$ and $C_2$ of the selector 46 are respectively supplied with sustained "1" and "0" from the line 173 as the output of the first bit of a frame pattern generator 170.

To $C_1$ and $C_3$ terminals, auxiliary data such as PCM signals of 63.64 kb/s or the order wires are supplied from the line 191. The selector 46, supplied with 2 bit binary signals at its terminals A and B, selects data, and couples the same to the terminals 1B of the selector 151. When the signal supplied to the terminal S from the line 19 is "L", the data bit stream on the line 131 is selected and supplied to the line 141, while if it is "H", then the output from the selector 46 is selected and supplied to the line 141. Since switching signals supplied to the line 19 are sent out via a timing control circuit as an output of the divider 187, a clock pulse appears per every 55 pulses. Therefore, only one out of 55 time slots is selected as the output from the selector 46. Switching of the selector 46 is conducted once per every 55 clock pulses, and the line 18 receives the output from the 2 stage-counter housed inside the time control circuit. This counter is supplied with clocks from the divider 187.

Figure 6:
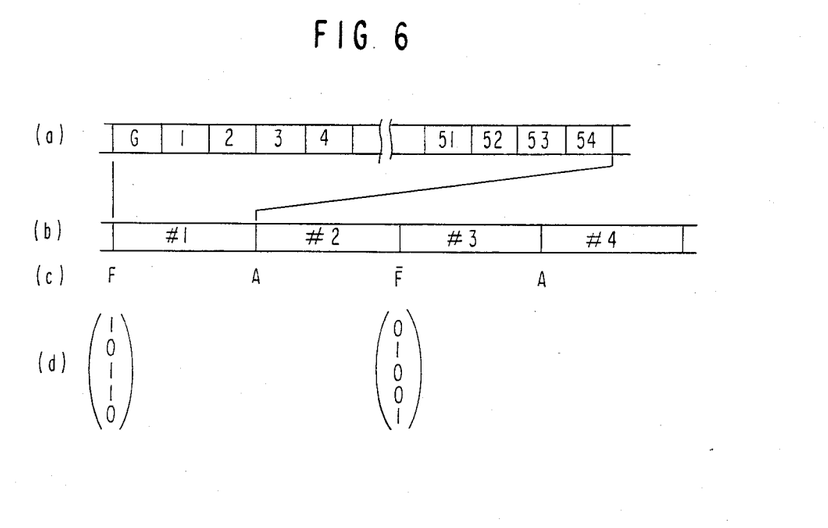
FIGS. 6a through 6d show 1-channel frame data formats.

Accordingly, one frame of the data bit train appearing on the line 141 comprises four sub-frames, these sub-frames comprising; a 1st sub-frame in which the service bit is the frame bit "F"(1), a 2nd sub-frame inserted with an auxiliary data bit, a 3rd sub-frame into which is inserted the frame bit "$\overline{F}$"(0), and a 4th sub-frame into which is inserted another auxiliary data bit. Each sub-frame is 55 bits long. This is illustrated in FIGS. 6(a), (b), and (c).

Processing for each of the other data bit streams is conducted by an inserter comprising respectively a selector 47 and a selector 52, a selector 48 and a selector 53, a selector 49 and a selector 54, and a selector 50 and a selector 55 by the same switch-over signals. To each $C_0$ terminal of the selectors 47–50 is respectively supplied fixed data of "0", "1", "1", "0" from the lines 174–177 of the frame pattern generator 170, while to the terminal $C_2$ is supplied with the respective datum complement. Accordingly, each of the data bit trains on other lines 142–145 also composes the frame formats identical to that shown in FIGS. 6(a), (b) and (c), and the frame bits F and $\overline{F}$ to be inserted become as shown in FIG. 6(d). ICs, such as SN 74153 and SN 54157, manufactured by Texas Instruments Incorporated, Dallas, Tex. U.S.A., may be used as the above mentioned two kinds of selectors.

Five data bit streams supplied to a 5B6B encoder 140 via the lines 141–145 as the output of the pulse insertion circuit 130 are converted to six data bit streams on the lines 151–156. The 5B6B encoder 140 comprises a programmable read-only memory (PROM). This encoder uses 5 bits as 1 block taken out from the same time slot of respective data bit trains, addresses memory cells of the P-ROM designated by the 5-bit codes by every timing pulse supplied via the line 20, and converts the same to parallel 6 bit codes having 6 bits as one block (word). The P-ROM stores a look-up table which converts 5 bit codes to 6 bit codes. This code conversion may use a 5B6B coding map described in Table 2 of "Binary Line Codes for Digital Transmission Optical Fibers", Study Group XVIII-Contribution No. 291, International Telegraph and Telephone Consultive Committee (CCITT), March 1979. In other words, a decimal number represented in binary form by the 5 bit code is input to the input word column, to select a 6 bit code corresponding to the same decimal number. Since codes converted by this code map are made bit-sequence-independently so as to keep the frequency of "0" and "1" appearance well-balanced, the output high bit rate obtained by multiplexing which is to be explained later is sufficient to extract the timing on the receiver side as well as to keep a balanced DC level. The timing signals for the line 20 have the same clock rate as the output of the divider 185, and are supplied from the timing control circuit.

Thus, each of the six parallel output lines 151–156 of the 5B6B encoder outputs six data bit trains which are bit-synchronized at the same speed as the input bit rate. This output is converted to one high speed data bit train supplied to a parallel-to-serial (P-S) converter 150, and is output on the line 161.

Figure 4:
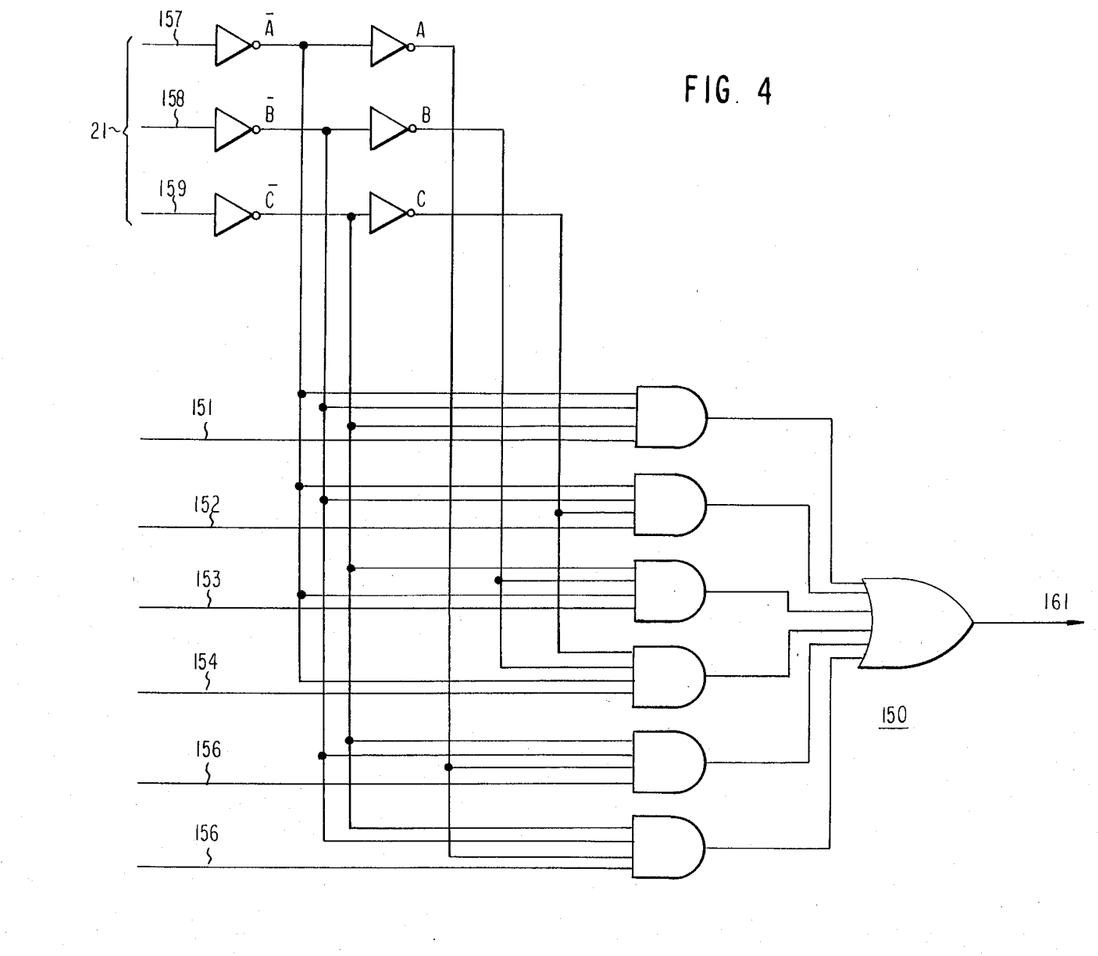
FIG. 4 is a logical operation circuit for a parallel-to-serial converter used in the embodiment of the present invention.
Figure 7:
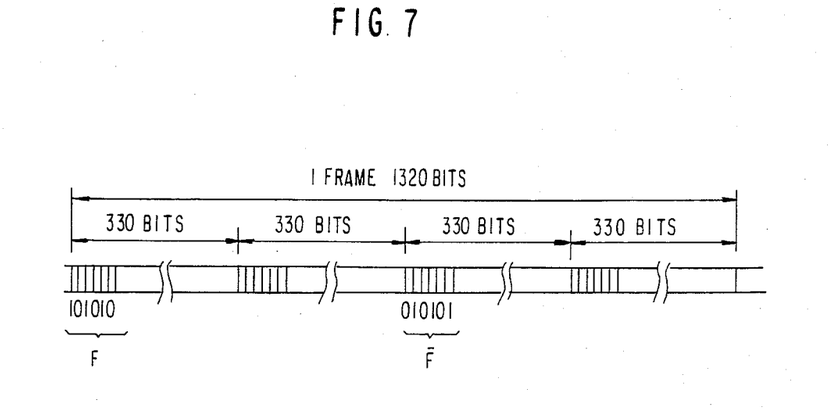
FIG. 7 shows a single data bit stream frame data format after code conversion.

Referring to FIG. 4, the P-S converter 150 comprises six AND gates, one OR gate, and inverters. It sequentially takes out bit by bit the data of each of the same time slots, of the data bit stream on the lines 151–156, selects or multiplexes the same and converts to the high speed single data bit stream by the binary codes appearing on the lines 157–159 as 3 bit parallel outputs of the base-6 binary counter (not shown) included inside a timing control circuit 190. Since the above mentioned base-6 binary counter runs under control of the 42.0053 Mbit/s clock which is the output from the VCO 181 via the timing control circuit 190, the bit stream at this bit rate is provided to the line 161. FIG. 7 shows the data format of a high speed data bit rate thus obtained. In FIG. 7, one frame consists of four sub-frames. In the 1st sub-frame, a frame pattern (101010) which has been 5B6B converted by block from the 5 bit frame pattern shown in FIG. 6(d) appears in 6-bits, and 6 bit words obtained by converting blocks of data bits sequentially appear thereafter. As for the second sub-frame, auxiliary data bits appear in the first 6 bits, followed by data bits; while in the 3rd sub-frame, a frame pattern (010101) which has been 5B6B converted and corresponds to the complement frame bit pattern shown in FIG. 6(d) appears first, followed by the data bits. In the 4th sub-frames, auxiliary data bits appear first for the first 6 bits as in the 2nd sub-frame. The number of bits per each sub-frame becomes 330 bits because of its 5B6B convertion.

The thus obtained single data bit stream is sent to an optical transmitter, where it is converted to optical signals by a driving laser diode or LED, and is output to an optical cable 162. The optical transmitter used herein is well known to those skilled in the art. U.S. Pat. No. 4,009,383 is incorporated herein by reference as an example of the optical transmitter.

Figure 8:
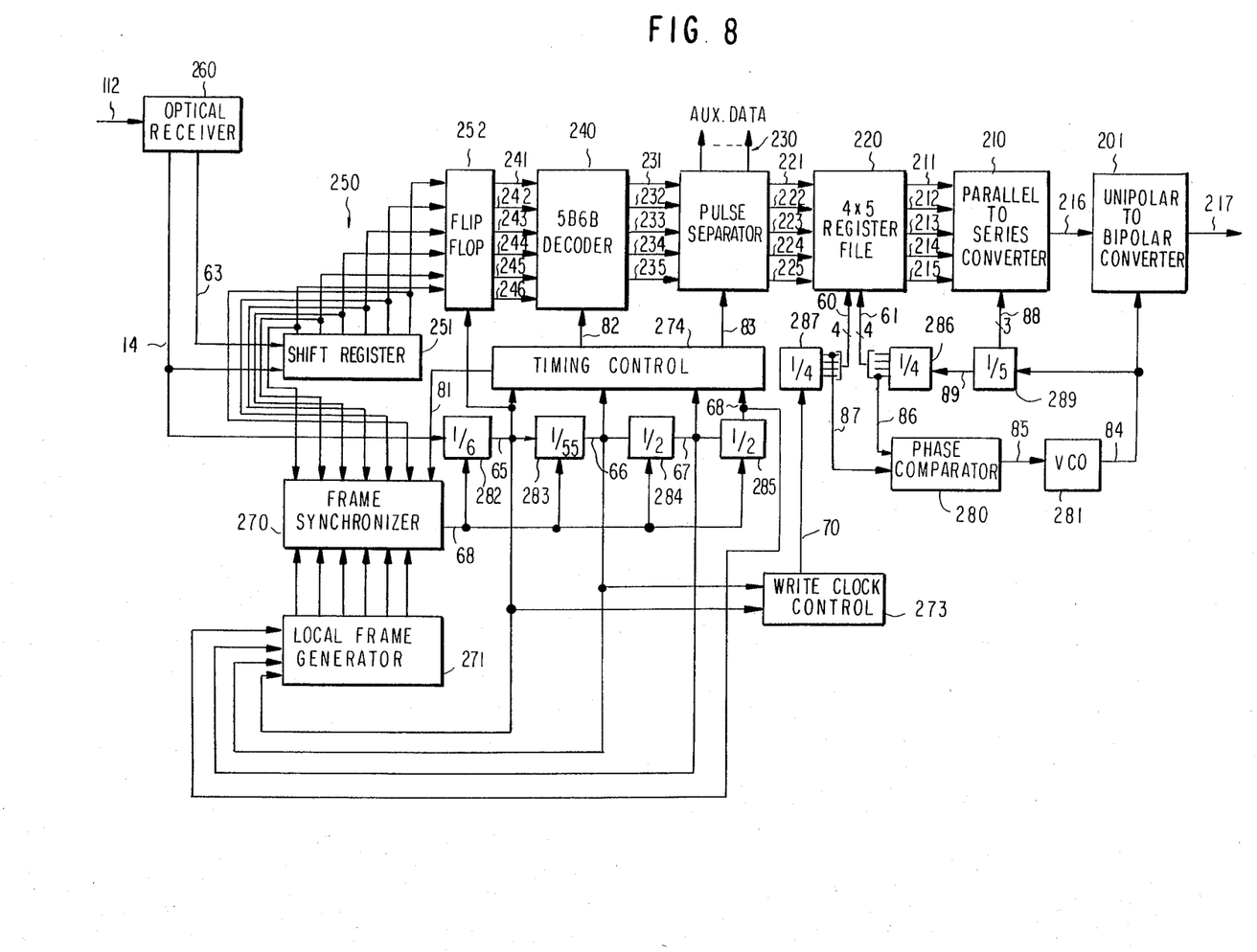
FIG. 8 is a block diagram for a receiver of a terminal repeater.

A receiver apparatus shown in FIG. 8 performs an inverse function of the apparatus shown in FIG. 1. The single data bit light stream on optical fiber 162 is converted to a bit stream of electric signals by an optical receiver 260. The receiver apparatus further includes a serial-to-parallel (S-P) converter 250, a 5B6B decoder 240, a pulse separation circuit 230, a register file 220, a parallel-to-serial (P-S) converter 210, and a unipolar-to-bipolar converter 201.

The optical receiver 260 includes an avalanche photodiode, a preamplifier, an AGC circuit and a regenerative circuit. U.S. Pat. No. 4,019,048 is incorporated herein by reference. Clocks regenerated at the optical receiver are supplied to a shift register via a line 64, and also to a counter 282 for dividing by 6. The output from a counter 282 is supplied to a counter 283 for dividing by by 55. the output from counter 283 is input to a counter 284 for dividing by 2, and that from a counter 284 to a counter 285 for dividing by 2, respectively. The local frame generator produces a bit stream having a frame pattern, "101010" and "010101" of 6 bits each at positions F, $\bar{F}$ shown in FIG. 7 on receiving outputs from respective frequency dividers. 6 bit outputs from the local frame generator are compared in a frame synchronizer with the patterns of the parallel bits of a shift register 251 written-in with the data on the line 63 every time the signal pulse to the line 81 from the timing control circuit 274 is provided. When the transmitted data bit train and the local frame generator bit train coincide at the position of the frame bit, the frame synchronization becomes established. If the frame synchronization does not become established, output signals from the frame synchronizer inhibit the running of the respective counters, thereby controlling the bit train phases from the local frame generator to shift phase thereof, to finally establish frame synchronization. After establishing the frame synchronization, each output from a shift register 241 is supplied to a flip-flop 252, and the serial data bit stream is converted to six parallel data bit streams having received pulses from a frequency divider 282. Data bit streams supplied to lines 241–246 as the output of the flip-flop are converted to 5 sequence bit streams at a 5B6B decoder by the output timing of a frequency divider 282 supplied via a timing control circuit 274. The 5B6B decoder comprises a P-ROM, and uses the same coding map as for the 5B6B encoder 140 to perform inverse conversion. Since each of the 5 sequence bit streams thus obtained has its frame synchronization of the serial data bit stream established, they are block synchronized in respect of each other, and further are synchronized as to the word (block) comprising bits in the same time slot of each bit stream. Data formats are respectively identical to those shown in FIG. 6. The data bit stream is supplied to a pulse separation circuit via the lines 231–235, from which auxiliary data bit is taken out.

Figure 9:
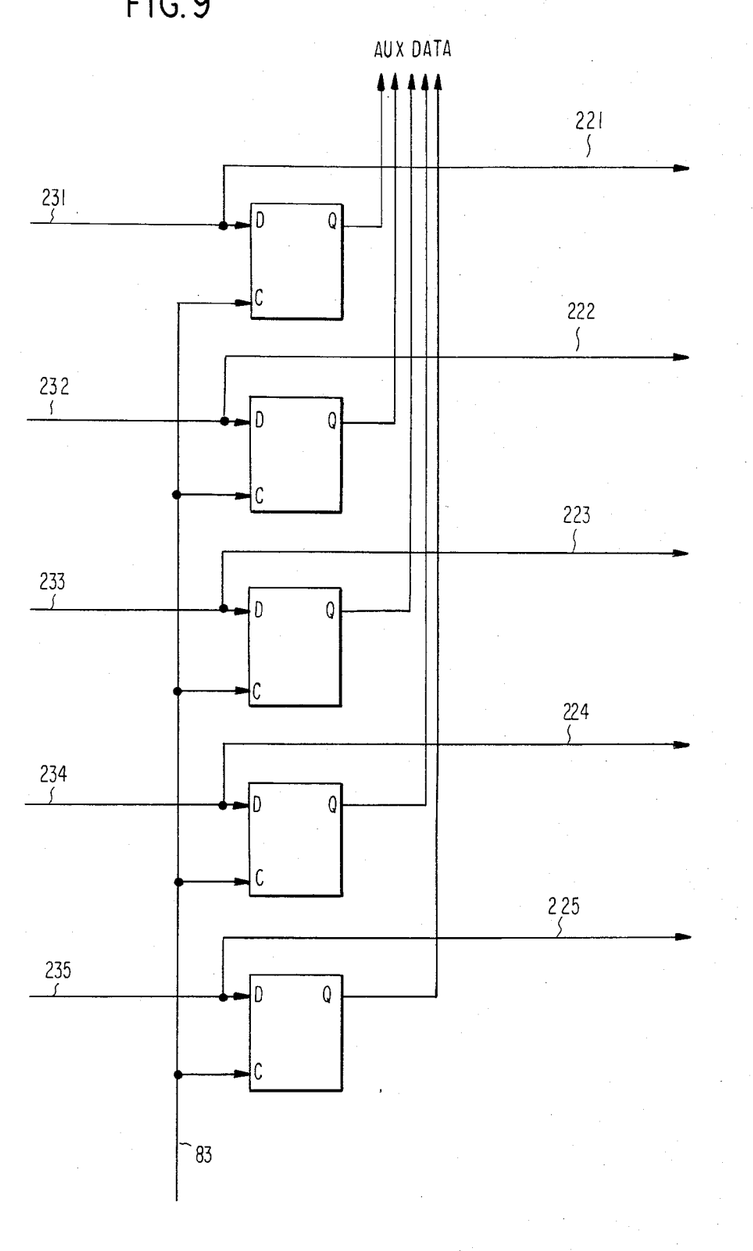
FIG. 9 is a block diagram for pulse separation circuit used in the receiver.

FIG. 9 shows a pulse separation circuit which includes six type-D flip-flops one for each of the data bit streams. To the line 83 are supplied timing signals from a divider 284 via a time control circuit 274. In other words, a pulse is supplied to the line 83 per every 110 data bits, and auxiliary data is taken out as an output from the flip-flop.

The data bit streams are simultaneously supplied to the register file via the lines 221–225 where they are subjected to bit rate conversion. That is to say, the streams are converted from 7.0008 Mb/s to 6.8736 Mbit. Frame bits F, $\bar{F}$ and auxiliary data bit in the data bit stream are also removed during the process of bit rate conversion in this register file, and the true data bits alone are taken out to the lines 211–215. The register file is constructed similarly to the transmitter register file shown in FIG. 2. The relationship of clock rates supplied to a write-in ring counter 287 and a read-out counter 286 is the only difference between the ring counters 184, 186 of the transmitter and the receiver ring counters 287, 286. The write clock generator which supplies write clocks to a 4-stage ring counter 287 is constantly running as it receives clocks from a divider 282, but inhibits one pulse per every 55 clock pulses as it receives an an output from a divider 283. Since no data is written in the flip-flop of the register at the timing thus inhibited, it is possible to remove frame bits and auxiliary data bits. Read clocks are at normal times supplied to a 4-stage ring counter 286 as an output of a counter 289 dividing the output pulses of a voltage-controlled oscillator (VCO) 281 by 5 which generates 34.368 Mbit/s. A phase comparator compares the phases of pulses supplied to the lines 86 and from one output from each of the 4-bit parallel output ring counters 287 and 286, and controls the VCO so as to keep the phase differences between the 4 parallel outputs from each of counters 286, 287 within predetermined values, thus making up a phase locked loop.

The data bit stream which has been speed-converted and supplied to the lines 211–215 is converted to a serial data bit stream at the parallel-to-serial converter 210. The P-S converter has substantially the same construction as that shown in FIG. 4. The P-S converter switches, bit by bit, the data on the lines 211–215 in response to the output from a base 5 counter 289. The obtained serial data bit stream of 34.368 Mbit/s are converted to bipolar codes at a unipolar-to-bipolar converter 201 and are then usually supplied to a demultiplexer apparatus.

As explained above, the present invention offers a system which is capable of multiple transmission of auxiliary signals such as order wires, monitoring and switch control information necessary for system construction to data signal.

Therefore, it provides a closed system with only terminal relay equipment and a main signal transmission cable (optical fiber cable).

The transmission distance is controlled only by the main signal transmission channel. Frame synchronization also acts as word synchronization because frame synchronization pattern is inserted after conversion to n bit parallel signals corresponding to nBmB codes. Thus, stable word synchronization may be secured. Errors in transmission channels are detected not by the parity check which involves numerous steps, but by the violations of conversion rules or the running digital sums during the prescribed period of time.

It is to be understood that the embodiment described herein is merely illustrative of the principles of the invention. Various modifications thereto may be effected by persons skilled in the art without departing from the spirit and the scope of the invention. For example, n not to be 5, or m need not to be 8 in nBmB conversion. While the invention is described above with reference to an optical fiber system, it is applicable to a coaxial cable system as well.

What is claimed is:

1. A digital transmission system adapted to a time division multiplex system comprising:
   means for converting a serial input data bit stream into parallel n bit streams;
   means for converting the bit rate of the parallel n bit streams to produce bit rate converted parallel n bit streams to produce an additional time slot in each of said parallel n bit streams per every predetermined number of data bits; means for inserting service bits in the additional time slots of respective ones of the bit rate converted parallel n bit streams to produce parallel n service-bit-inserted bit streams at the converted bit rate, said service bits including framing bits which appear for every preselected number of bits in each of said n bit streams;
   means for converting mutually corresponding parallel n-bits of the parallel n service-bit-inserted bit streams into parallel m-bits to produce parallel m bit streams; and
   means for multiplexing the parallel m bit streams into a signal output bit stream having a framing-bit pattern made-up of m bits which correspond to m framing bits taken out in the same timing of the n service-bit-inserted bit streams.

2. In a data transmission system utilizing nBmB codes, a transmitter comprising:
   receiver means for receiving a serial bit stream of main data bits;
   series to parallel converter means for converting said serial bit stream into parallel n bit code streams of main data bits;
   bit rate conversion means for receiving said parallel n bit code streams at a first predetermined rate and for outputting said received parallel n bit streams at a second predetermined rate, said second predetermined rate being more rapid than said first predetermined rate;
   said bit rate conversion means further including means for periodically inhibiting the parallel n bit streams to establish a vacant time slot in each of said parallel n bit streams each time a preselected number of data bits have been outputted from said bit rate conversion means;
   bit insertion means for inserting at least service bits in the vacant time slots of respective ones of the bit rate converted parallel n bit streams, said service bits including framing bits which periodically appear in each of the n bit streams for every preselected number of bits;
   encoder means for encoding said bit rate converted parallel n bit streams of main data and service bits to produce parallel m bit code streams; and
   parallel to series converter means for converting said parallel m bit code streams into a serial bit stream of main data and auxiliary bits.

3. In a transmitter of a data transmission system utilizing nBmB as claimed in claim 2, further including optical transmitter means coupled to said parallel to series converter means for transmitting said serial bit stream of main data, and service bits as optical signals.

4. In a transmitter of a data transmission system utilizing nBmB codes as claimed in claim 2, wherein said bit rate conversion means includes;
   n, multiple bit register means, one such register means being connected to each of the parallel outputs of said series to parallel converter means for storing a plurality of said parallel n bit code streams;
   first clock means for shifting at said first preselected rate, parallel n bit code streams from said series to parallel converter means into said n, multiple bit register means;
   second clock means for producing clock signals at said second predetermined rate;
   gate means, responsive to said second clock means for shifting parallel n bit code streams out of said n, multiple bit register means at said second predetermined rate.

5. In a transmitter of a data transmission system utilizing nBmB codes as claimed in claim 4, wherein said bit insertion means comprises:
   a first group of n selector means, one selector means of said first group being associated with a different one of said n bit streams, each of said selector means of said first group having a first input connected to receive auxiliary data bits, a second input connected to receive service bits, and a third input connected to receive control codes for causing said selector means of said first group to output either an auxiliary bit or a service bit;
   a second group of n selector means, one selector means of said second group of selector means being associated with a different one of said n bit streams, each of said selector means of said second group having a first input connected to receive auxiliary and service bits from a corresponding selector means of said first group of n selector means, a second input for receiving main data bits, and a third input for receiving control codes for causing the said selector means of said second group to output either a main data bit or an auxiliary or service bit.

6. In a transmitter of a data transmission system utilizing nBmB codes as claimed in claim 5, further including a frame pattern generator for producing said service bits.

7. In a data transmission system utilizing nBmB codes, a receiver comprising:
   means for receiving a serial bit stream of main data bits and a framing bit pattern of m bits repeated at a predetermined interval;
   means for establishing frame synchronization with the serial bit stream by referring to the framing bit pattern;
   series to parallel converter means for converting said serial bit stream into parallel m bit code streams each having a repeated bit corresponding to one of the bits of the framing pattern, each m-bit code being block-synchronized as a result of the establishment of frame synchronization;
   decoder means for decoding said parallel m bit code streams to produce parallel n bit code streams each having a repeated framing bit which corresponds to one of the n bits of the code derived from the m bits of the framing pattern;
   pulse separator means for removing the framing bits in said parallel n bit code streams;
   means for converting the bit rate of said parallel n bit code streams to produce bit-rate-converted parallel n bit code streams; and
   parallel to series converter means for converting bit rate converted parallel n bit code streams into a serial bit stream.

8. In a receiver of a data transmission system utilizing nBmB codes as claimed in claim 7, wherein said pulse separator means includes:
   input means for receiving said parallel n bit code streams;
   means for selectively receiving bits of the parallel n bit code stream;
   means for causing said parallel n bit code streams to by-pass said means for selectively receiving bits of the parallel n bit code stream;
   clock means for causing selected bits of the parallel n bit code streams to be received by said means for selectively receiving; and
   means for reading out the contents of said means for selectively receiving.

9. In a receiver of a data transmission system utilizing nBmB codes as claimed in claim 8, wherein said means for selectively receiving is comprised of n flip-flop circuits, one of said flip-flops being associated with a different one of said parallel n bit code streams.

* * * * *

UNITED STATES PATENT AND TRADEMARK OFFICE
CERTIFICATE OF CORRECTION

PATENT NO. : 4,520,480
DATED : May 28, 1985
INVENTOR(S) : Kiyoaki KAWAI

It is certified that error appears in the above-identified patent and that said Letters Patent is hereby corrected as shown below:

Column 5, line 39, delete "convertion" and insert --conversion--;

Column 5, line 63, delete "by"; second occurrence line 63, delete "the" and insert --The--;

Column 6, line 16, delete "241" and insert --251--;

line 67, after "and" insert --87--;

Column 7, line 12, before "obtained" insert --thus--;

line 39, after "n" insert --need--.

Signed and Sealed this

Fifth Day of November 1985

[SEAL]

Attest:

DONALD J. QUIGG

Attesting Officer

Commissioner of Patents and Trademarks